UNITED STATES PATENT OFFICE.

ORLANDO M. THOWLESS, OF NEWARK, NEW JERSEY, ASSIGNOR OF ONE-HALF TO ARTHUR J. THOWLESS, OF NEWARK, NEW JERSEY.

DUCTILE FILAMENT.

1,226,925.  Specification of Letters Patent.  Patented May 22, 1917.

No Drawing.  Application filed August 9, 1915.  Serial No. 44,512.

*To all whom it may concern:*

Be it known that I, ORLANDO M. THOWLESS, a subject of the King of Great Britain, residing at Newark, in the county of Essex and State of New Jersey, have invented new and useful Improvements in Ductile Filaments, of which the following is a specification.

The object of my invention is to produce ductile filaments to be used in electrical incandescent lamps which shall be free from all undesirable and deleterious substances and which shall not darken the containing bulbs while lighted, although wire, rods and filaments for other purposes may be produced by my method.

To attain this object, I press powdered tungsten into a mold by means of a hydraulic press and form sticks or rods, which may be a quarter of an inch in diameter and about six inches long. A stick, so pressed, is heated in an atmosphere of hydrogen until it becomes strong enough to be easily handled. It is then placed in a flashing-jar or other suitable vessel, and heated to a high sintering temperature in the presence of an atmosphere composed of the vapor of a halogen salt of tungsten, such as the hexachlorid, and dry hydrogen. This causes a deposit of tungsten to form in and to permeate through the tungsten mass while it is sintering and it is thus consolidated into a structurally solid billet or slug of metal, as the spaces between the particles of the powdered tungsten will become filled with the flashed metal and united closely therewith. Some part of the flashed metal will be deposited on the surface of the slug after the spaces are filled up, but this will improve the slug and tend to make it more uniform. After the slug is thoroughly sintered and treated with the tungsten flashing, the flashing-jar may be exhausted and the treated slug be heated and submitted to the action of exhaust pumps to remove any occluded gases therefrom. The slug is slowly cooled and submitted to hot-working and drawing into filamentary diameter.

Other metals than tungsten may be used for the pressed powder and also for the flashing as, for instance, a flashing of thorium may be given to a mass of tungsten, or a flashing of two or more metals may be applied to one or more metal powders.

In any of these flashings applied to the pressed powders during the sintering of the latter, the flashing does not merely join the outer particles of the powder together, but appears to permeate the entire mass and tends to solidify it; therefore thorium may be used with advantage as a permeating material with the powdered slug.

What I claim is:

1. In the method of making ductile wire the step which consists in sintering a mass of compressed refractory metal powder in the presence of a mixture of dry hydrogen and the vapor of a halogen salt of a refractory metal.

2. In the method of making ductile wire the steps, which consist in heating a mass of refractory metal powder to a high temperature, bringing into contact with it, while in such heated condition, a mixture of dry hydrogen and the vapor of a salt of tungsten, causing flashed tungsten to unite with the powdered metal, and maintaining such heat until the united materials are consolidated into a structurally solid body.

3. In the method of making ductile filaments, the steps, which consist in uniting flashed refractory metal with powdered refractory metal in a manner to form a mixture of the two and at the same time consolidating the entire mass into a structurally solid body.

4. The method of making ductile filaments, which consists in uniting flashed refractory material with powdered refractory material in a manner to form a mixture of the two, at the same time consolidating the entire mass into a structurally solid body, working this body into a fibrous structure and reducing it to a filamentary diameter.

5. In the method of making ductile filaments the step which consists in sintering a body of refractory metal powder in an atmosphere of reducing gas and the vapor of a halogen salt of a refractory metal to the extent of causing the metal contained in the halogen vapor to permeate and fill up the spaces existing between the particles of metal powder composing the body, thereby producing a structurally solid body.

6. In the method of making ductile filaments the steps, consisting in heating to a high temperature a mass of powdered refractory metal and causing a flashing of refractory material to enter between and unite with the powdered particles.

7. In the method of making ductile filaments the steps which consist in permeating powdered refractory metal bodies, during the operation of sintering, with deposited metal and forming them into solid homogeneous bodies.

8. A filament composed of refractory metal having permeated through its pores a different refractory metal.

9. A filament composed of tungsten having permeated through its pores a deposit of tungsten.

10. A body of refractory metal composed of partly sintered and partly deposited metal, the deposited metal permeating the said body throughout its entire structure.

11. A body of refractory metal having united within itself and forming a coherent part therewith a deposit of refractory substance permeating the said body.

ORLANDO M. THOWLESS.

Witnesses:
JOHN GLENN BLUEREON,
HERBERT L. THOWLESS.